April 8, 1924.

F. STIRLING 1,489,907

METHOD AND APPARATUS FOR SPRAYING TREES AND THE LIKE

Filed April 30, 1923   2 Sheets-Sheet 2

Inventor
Frank Stirling,
By S. M. McColl
Attorney

Patented Apr. 8, 1924.

1,489,907

UNITED STATES PATENT OFFICE.

FRANK STIRLING, OF GAINESVILLE, FLORIDA.

METHOD AND APPARATUS FOR SPRAYING TREES AND THE LIKE.

Application filed April 30, 1923. Serial No. 635,494.

*To all whom it may concern:*

Be it known that I, FRANK STIRLING, a citizen of the United States of America, residing at Gainesville, in the county of Alachua, in the State of Florida, have invented certain new and useful Improvements in Methods and Apparatus for Spraying Trees and the like, of which the following is a specification.

This invention relates to an improved method and apparatus for spraying fruit trees, ornamentals, vegetable or crops of any kind.

The primary object of the invention is to provide a spraying apparatus so constructed and operated as to avoid the necessity of hauling around through the orchard or field large solution carrying containers together with a power plant for spraying the solution, the expense of which is very heavy, thus providing for the spraying of orchards and the like at much less cost and with much less cumbersome machinery than has heretofore been employed.

Another object is to provide for the transmission of the power necessary for operating a spraying pump by means of water under pressure obtained from any waterworks system having mains, hydrants etc.

Figure 1:
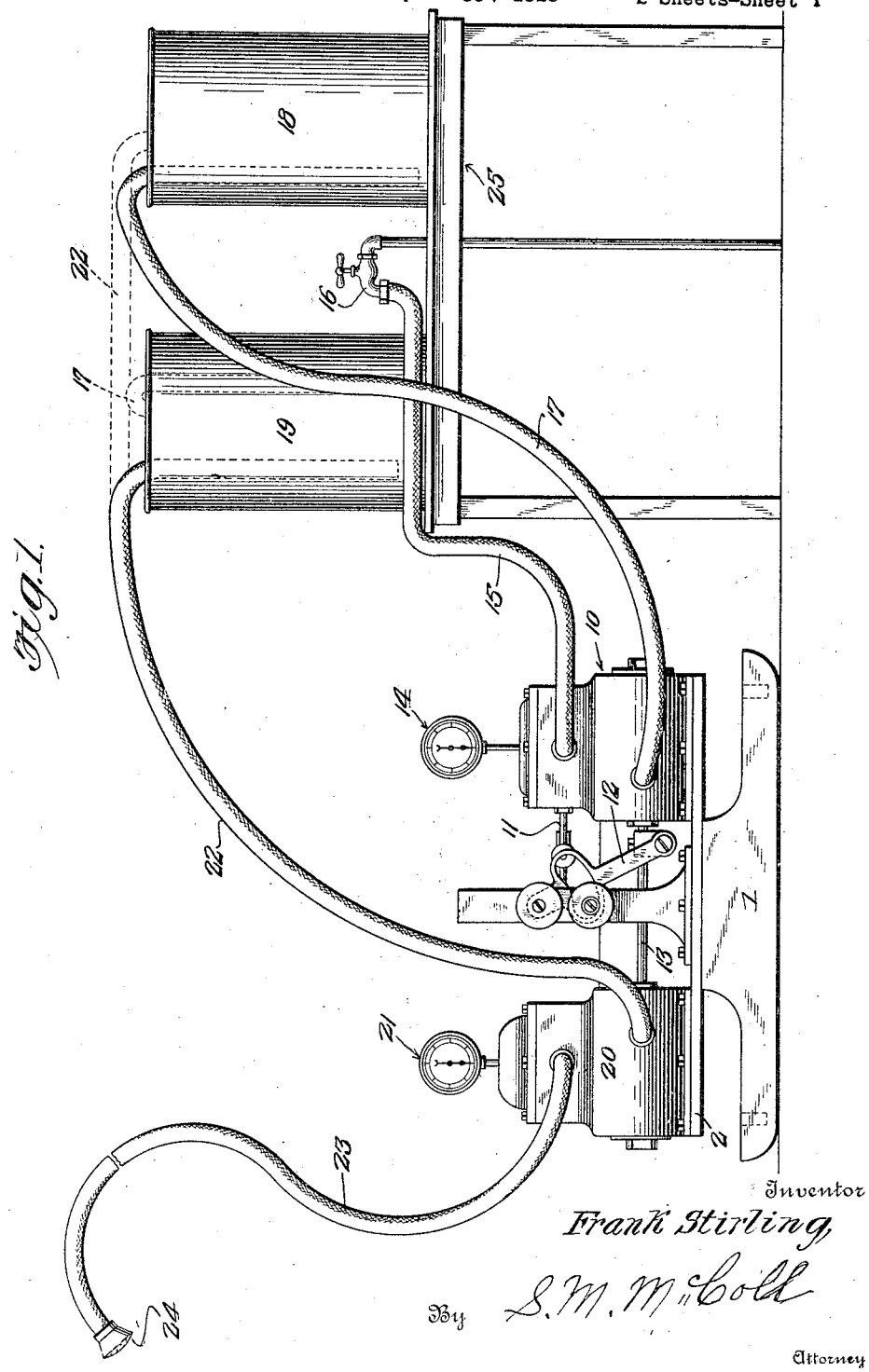
Figure 2:
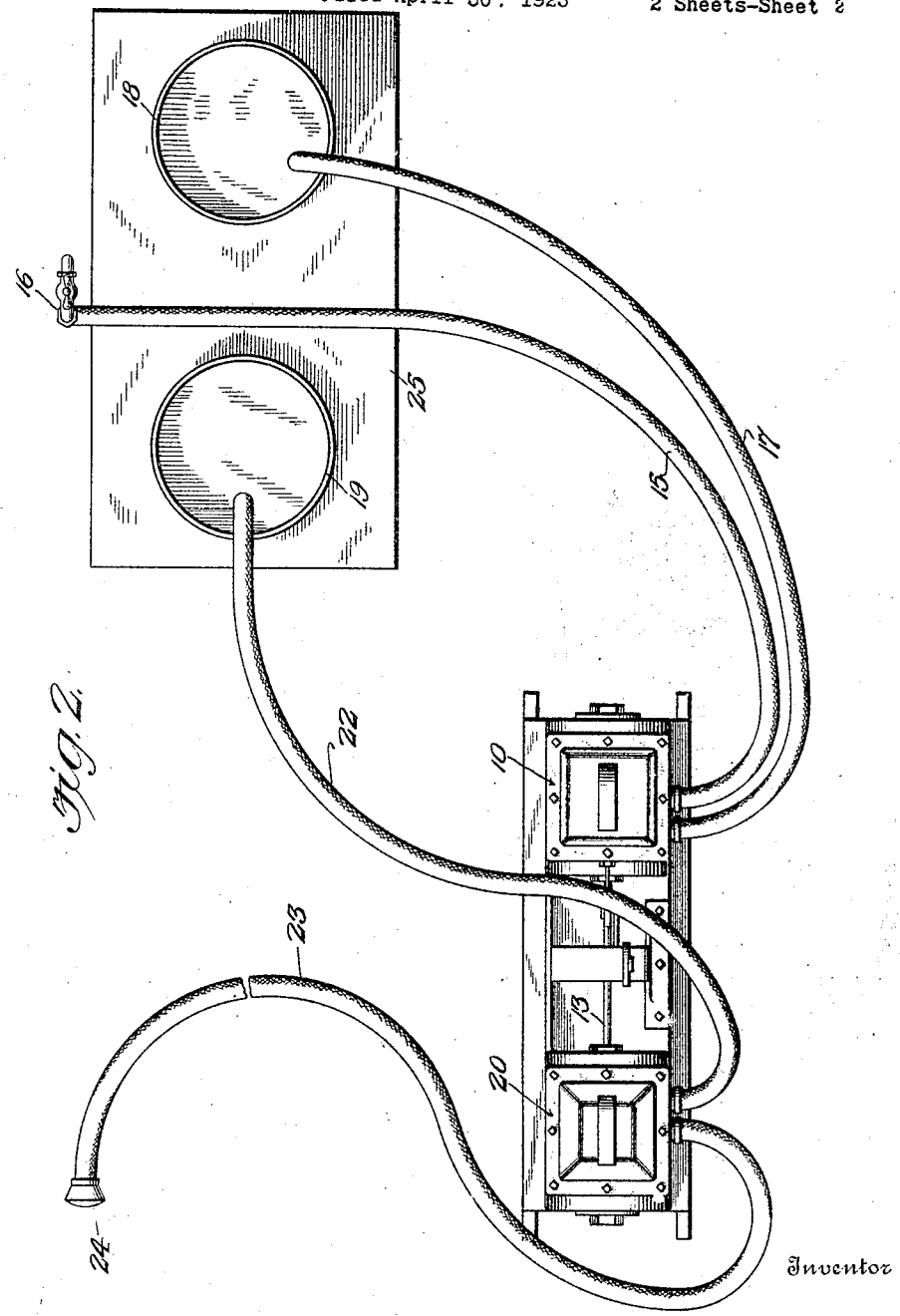

Various other objects and advantages of this invention will be brought out in the following specific disclosure of the present preferred embodiment illustrated in the accompanying drawings wherein:

Figure 1 represents a side elevation of a portable spraying apparatus constructed in accordance with the invention; and Fig. 2 represents a top plan view thereof.

The same reference numbers indicate corresponding parts in the different figures.

In the embodiment illustrated a supporting base of any suitable construction is shown at 1 with a table or platform 2 mounted thereon carrying a water motor 10 and a spray pump 20 which may be of any suitable or desired construction. The piston rod 13 of the pump is driven by the water propelled motor 10 through the rod 11 and pitman 12. The motor 10 and pump 20 are provided respectively with suitable gages 14 and 21.

A pipe 15 for supplying water under pressure for operating the motor 10 is designed to be connected with a faucet 16 which forms a part of any waterworks system already installed, or a special system consisting of water mains, hydrants etc. installed throughout the orchard for use in connection with this spraying apparatus. The installation of a water system throughout the orchard to be sprayed for furnishing water under pressure to operate the motor 10, is much less expensive than hauling a power plant, usually a gasoline engine, around through the orchard. Such an installation also effects a large saving in the cost of transporting water as the exhaust water from the motor is used for mixing the spraying solution as will be hereinafter more fully described.

The exhaust pipe 17 for carrying off the exhaust water from the motor 10 is designed to discharge alternately into two spraying solution tanks shown at 18 and 19 which may be located on any suitable support a platform 25 being here shown. These two tanks 18 and 19 are designed to be alternately connected with the pump 20 by a suction hose 22, the free end of which may be removed from one tank and inserted in the other so that the spraying solution may be continuously supplied to the pump. While the spraying solution is being pumped from one tank the exhaust water from the motor is conducted to the other tank through pipe 17, which tank contains the spraying material. This material is mixed with the exhaust water supplied as above described and produces a spraying solution ready for use by the time the solution in the tank with which the suction hose is connected, is exhausted. The only operation necessary to effect the change is to pull the suction pipe 22 out of the exhausted tank and insert it in the full tank, so that there will be no stoppage of the spraying operation during the shifting of the hose from one tank to the other.

A spraying hose 23, of any desired length, is connected with pump 20 and is equipped with a spraying nozzle 24 of any suitable character.

In the use of this apparatus the base 1 equipped with the motor 10 and pump 20 having the pipes 15, 17, 22 and 23 connected therewith, together with the empty tanks 18 and 19, and the material from which the spraying solution is to be formed, are conveyed to the territory to be sprayed and in which locality a water faucet 16 is located. The pipe 15 is then connected with the faucet and the water turned on whereupon the motor 10 will be actuated and by placing pipe 17 in one of the tanks 18 or 19 in which the spraying material has been placed the solution will soon be ready for use. The suction pipe 22 is then inserted in the tank containing the solution and the pipe 17 inserted in the other tank. The continued operation of the motor will cause the pump to draw the spraying solution out through pipe 22 and pump it out through the hose 23 and nozzle 24 onto the object to be sprayed.

A pressure of 40 pounds transmitted to the water motor will provide a working pressure from the pump of from 200 to 300 pounds.

From the above description it will be seen that the water performs the double function of operating the pump and supplying the necessary fluid to form the spraying solution. Moreover any excess water remaining after supplying the pump is available for irrigating the trees in the orchard, which is an important fact or where citrous fruits are grown since they require considerable moisture and many orchardists pipe their orchards for the sole purpose of irrigation.

I claim as my invention:

1. A step in the process of spraying trees and the like which consists in employing a water propelled motor for actuating a spraying pump and utilizing the exhaust water from the motor to mix the spraying solution.

2. A step in the process of spraying trees and the like which consists in using the same water to drive the spraying pump operating motor and to supply the necessary fluid to form the spraying solution.

3. A process of spraying trees and the like which consists in utilizing a spray pump operated by a water motor, connecting said motor with water under pressure, utilizing the exhaust water to mix the spraying solution, and supplying the pump with such solution.

4. In an apparatus for spraying trees and the like a plurality of containers for the spraying solution, a spray pump, a water propelled motor connected to operate said pump, a suction pipe leading from said pump and adapted to be inserted in one of said containers, a pipe for conducting the exhaust water from said motor to another of said containers, said pipes being interchangeable in said containers whereby one of the containers is filled while the other is emptied.

5. A method of spraying trees and the like which consists in connecting a water motor to drive a spray pump, supplying water under pressure to operate said motor, and conducting the exhaust water from the motor to supply fluid for mixing the spraying solution, supplying a plurality of spraying solution tanks, and alternately discharging the exhaust water from the motor into the tanks, and alternately conducting the solution from the tanks to the pump.

In testimony whereof I affix my signature.

FRANK STIRLING.